United States Patent
Scholz et al.

(10) Patent No.: US 11,077,523 B2
(45) Date of Patent: Aug. 3, 2021

(54) METHOD AND DEVICE IN PARTICULAR FOR GENERATIVELY PRODUCING AND CODING A THREE-DIMENSIONAL COMPONENT

(71) Applicant: LINDE AKTIENGESELLSCHAFT, Munich (DE)

(72) Inventors: Jürgen Scholz, Munich (DE); Ernst Miklos, Kirchheim (DE); Jim Fieret, Orpington (GB); Pierre Foret, Munich (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 325 days.

(21) Appl. No.: 16/300,084

(22) PCT Filed: May 12, 2017

(86) PCT No.: PCT/EP2017/025122
§ 371 (c)(1),
(2) Date: Nov. 9, 2018

(87) PCT Pub. No.: WO2017/194204
PCT Pub. Date: Nov. 16, 2017

(65) Prior Publication Data
US 2019/0176266 A1    Jun. 13, 2019

(30) Foreign Application Priority Data
May 13, 2016    (EP) .................................... 16001090

(51) Int. Cl.
*B23K 15/00*    (2006.01)
*B23K 26/34*    (2014.01)
(Continued)

(52) U.S. Cl.
CPC .............. *B23K 26/34* (2013.01); *B22F 3/105* (2013.01); *B22F 10/20* (2021.01); *B23K 10/027* (2013.01);
(Continued)

(58) Field of Classification Search
CPC ...... B22F 2003/1056; B22F 2003/1057; B22F 2201/04; B22F 2203/03; B22F 3/105;
(Continued)

(56) References Cited

U.S. PATENT DOCUMENTS 2,932,741 A    4/1960  McKay
5,586,157 A    12/1996 Gross
(Continued)

FOREIGN PATENT DOCUMENTS

DE    10 2010 026 139 A1    1/2012
EP    2 028 283 B1    12/2011
(Continued)

OTHER PUBLICATIONS

PCT International Search Report for PCT/EP2017/025122; dated Aug. 7, 2017; Authorized Officer: Aliouane, Nadir; 8 pgs. total (4 pgs. English language translation).
(Continued)

*Primary Examiner* — Sang Y Paik
(74) *Attorney, Agent, or Firm* — Millen White Zelano & Branigan, PC; Brion P. Heaney

(57) ABSTRACT

The invention relates to a method for producing, in particular generatively producing, and coding a three-dimensional component. Said method comprises the following steps: providing a starting material, supplying a process gas to the starting material, melting the starting material by means of a heat source, and repeating the aforementioned steps. The method according to the invention is characterized in that, at least at a predetermined time interval during the melting of
(Continued)

the starting material, a coding component or a coding gas containing a coding component is added to the process gas such that the use of the coding component in the finished object is detectable, and coding information is logged which describes the coding information and the location thereof in the component.

25 Claims, 1 Drawing Sheet

(51) Int. Cl.
*B33Y 10/00* (2015.01)
*B33Y 30/00* (2015.01)
*B22F 3/105* (2006.01)
*B29C 64/153* (2017.01)
*B29C 64/371* (2017.01)
*B22F 10/20* (2021.01)
*B33Y 40/00* (2020.01)
*B33Y 50/02* (2015.01)
*B23K 26/354* (2014.01)
*B23K 10/02* (2006.01)
*B29C 64/20* (2017.01)
*B29C 64/386* (2017.01)
*B22F 10/30* (2021.01)

(52) U.S. Cl.
CPC ........ *B23K 15/0086* (2013.01); *B23K 26/354* (2015.10); *B29C 64/153* (2017.08); *B29C 64/371* (2017.08); *B33Y 10/00* (2014.12); *B33Y 30/00* (2014.12); *B33Y 40/00* (2014.12); *B33Y 50/02* (2014.12); *B22F 10/30* (2021.01); *B22F 2201/04* (2013.01); *B22F 2203/03* (2013.01); *B29C 64/20* (2017.08); *B29C 64/386* (2017.08); *Y02P 10/25* (2015.11)

(58) Field of Classification Search
CPC . B22F 3/1055; B23K 10/027; B23K 15/0086; B23K 26/34; B23K 26/354; B29C 64/153; B29C 64/20; B29C 64/371; B29C 64/386; B33Y 10/00; B33Y 30/00; B33Y 40/00; B33Y 50/02; Y02P 10/25; Y02P 10/295

USPC .......................................... 219/121.6–121.86
See application file for complete search history.

(56) References Cited

U.S. PATENT DOCUMENTS

| | | |
|---|---|---|
| 2007/0272053 A1* | 11/2007 | Brice ................... B22F 3/1055 75/10.13 |
| 2010/0310404 A1 | 12/2010 | Ackelid |
| 2012/0035061 A1 | 2/2012 | Bransky et al. |
| 2012/0223059 A1 | 9/2012 | Ackelid |
| 2014/0370323 A1* | 12/2014 | Ackelid ............... B23K 26/342 428/548 |
| 2014/0373679 A1 | 12/2014 | Heidloff |
| 2015/0279524 A1 | 10/2015 | Reep et al. |
| 2016/0145747 A1 | 5/2016 | Watson et al. |
| 2016/0145758 A1 | 5/2016 | King et al. |
| 2016/0153102 A1 | 6/2016 | Watson et al. |
| 2016/0161242 A1 | 6/2016 | Cook et al. |
| 2016/0168716 A1 | 6/2016 | Kling et al. |
| 2016/0169783 A1 | 6/2016 | Levasseur et al. |
| 2016/0253586 A1 | 9/2016 | Cook et al. |
| 2017/0369495 A1* | 12/2017 | Jasper .................... C07C 51/41 |
| 2018/0145755 A1 | 5/2018 | Bartley et al. |

FOREIGN PATENT DOCUMENTS

| | | |
|---|---|---|
| JP | 2002 097532 A | 4/2002 |
| JP | 2013 040074 A | 2/2013 |
| WO | WO 2015/185155 A1 | 12/2015 |

OTHER PUBLICATIONS

PCT Written Opinion for PCT/EP2017/025122; dated Aug. 7, 2017; Authorized Officer: Aliouane, Nadir; 7 pgs. total.

PCT International Search Report for PCT/EP2017/025124; dated Sep. 1, 2017; Authorized Officer: Morra, Valentina; 6 pgs. total (2 pgs. English language translation).

PCT Written Opinion for PCT/EP2017/025124; dated Sep. 1, 2017; Authorized Officer: Morra, Valentina; 6 pgs. total.

* cited by examiner

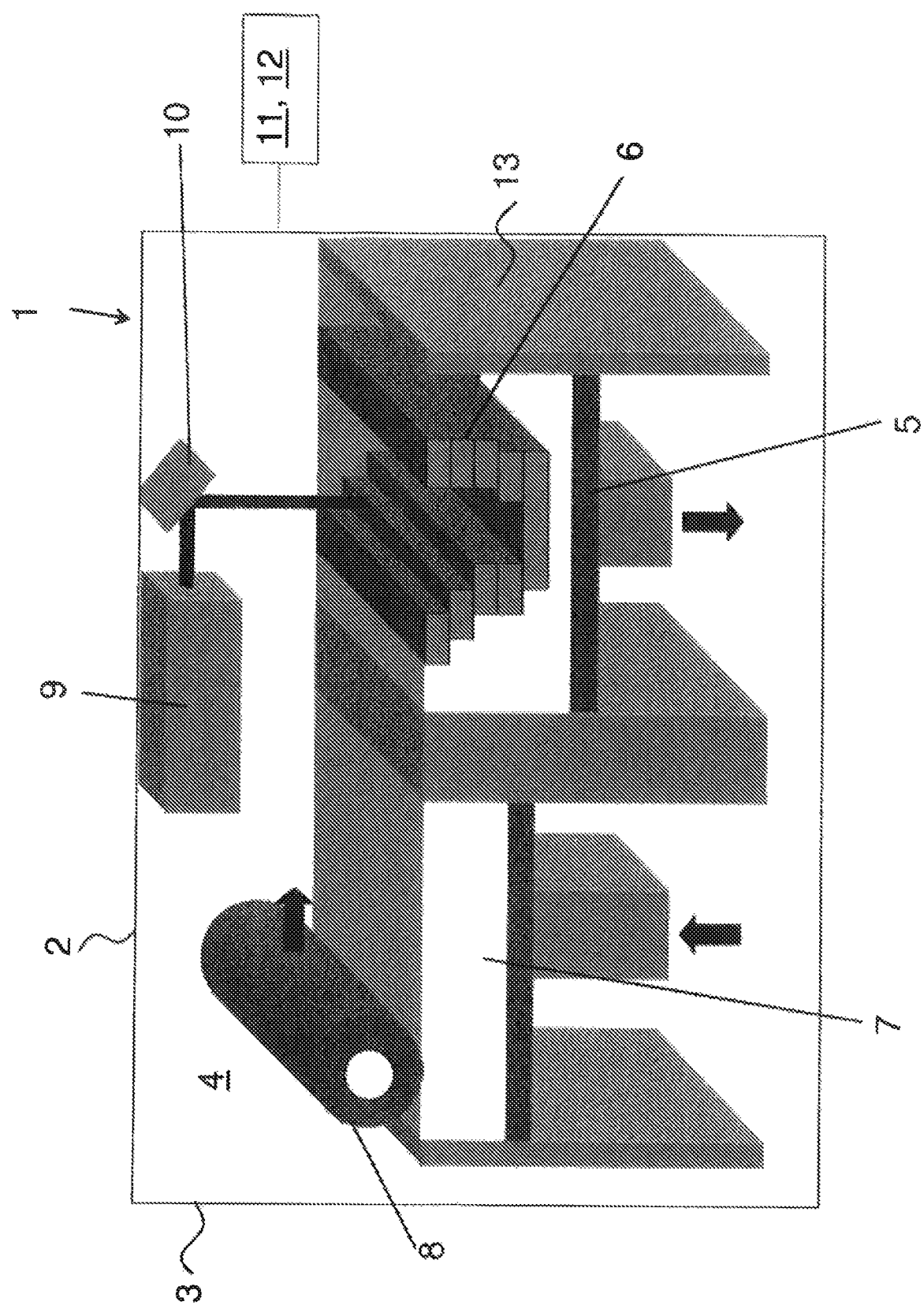

METHOD AND DEVICE IN PARTICULAR FOR GENERATIVELY PRODUCING AND CODING A THREE-DIMENSIONAL COMPONENT

The invention relates to a method and a device for producing, in particular generatively producing, and coding a three-dimensional component.

Generative production methods make it possible to manufacture a wide variety of three-dimensional components with a complex geometry.

For example, during 3D printing, three-dimensional workpieces are constructed layer by layer. The construction is computer controlled, and involves one or several liquid or solid materials with prescribed dimensions and shapes (CAD). Physical or chemical curing or melting processes take place during construction. Typical materials for 3D printing include plastics, synthetic resins, ceramics and metals. 3D printers are used in industry and research. Apart from that, there are also applications in the home and entertainment area, as well as in art.

3D printing is a generative or additive production process. The most important techniques in 3D printing are selective laser melting and electron beam melting for metals, and selective laser sintering for polymers, ceramics and metals, stereolithography and digital light processing for liquid synthetic resins and PolyJet modeling as well as fused deposition modeling for plastics and in part synthetic resins.

Another generative method involves point melting and solidification. In this type of method, metal powder or metal wire is melted and solidified layer by layer, so that a three-dimensional component can be generated. Given the local limitation of introducing energy by means of a laser beam, the size of the weld pool is small. This makes it possible to generate filigree structures. Corresponding methods are commercially available as laser engineered net shaping (LENS), direct metal deposition (DMD), laser additive manufacturing (LAM), selective laser melting (SLM), laser metal fusion (LMF) or laser metal deposition (LMD).

With respect to local sintering and melting, a distinction is made between indirect and direct methods.

Selective laser sintering (SLS) is a method for producing spatial structures through sintering out of a powdery starting material. Laser sintering is a generative layer manufacturing method: The workpiece is constructed layer by layer. Through exposure to laser beams, any three-dimensional geometries desired can be generated in this way, even with undercuts, e.g., workpieces that cannot be produced in a conventional mechanical or casting manufacturing process.

In selective laser sintering (SLS/LMF), a layer of powdery material is applied to a working surface (building platform). The loose powder is point melted by a laser beam. Depending on the material used, the powder particles are here connected in the layer and with the underlying layer. In order to produce metal components, a distinction can be made between two basic directions of development. Apart from directly solidifying metal powder materials through laser irradiation (direct metal-laser sintering), the manufacture of metal components by combining the SLS of plastic-coated metal powder with subsequent thermal treatment (IMLS) already established itself early on.

In direct metal-laser sintering (DMLS), either single- or multi-component metal materials are used. In particular, use is here made of DMLS-multi-component powders, which consist of various alloy elements. The low-melting component contained in the powder is melted by a laser beam, and flows around the high-melting component, which provides the structure.

In electron beam melting (EBM), the process essentially mirrors the laser-based method. Loose metal powder, in a powder bed or via a nozzle or wire, are here point melted, and then solidified in the desired contour. The energy required for this purpose is introduced by an electron beam. The method most often takes place in a vacuum chamber flooded with inert gas.

Accordingly, generative production methods make use of a powder bed, a powder feed or a wire feed, wherein these starting materials are then melted by means of a laser beam, electron beam, plasma/electric arc, and subsequently hardened. In addition, inert or active gases are used as process gases in the generative production methods.

When using an inert gas atmosphere, the composition of the applied starting material remains essentially unchanged after having been melted by means of a heat source. The melting, solidification and thermal influence zones change the metallurgical properties by comparison to the original material.

When using an active gas atmosphere, the active gases can chemically react with the starting material. For this reason, the composition and properties of the applied material also differ in terms of the chemical composition of the starting material. This process is often referred to as gaseous alloying. Examples of the latter include the application of titanium in a gas atmosphere containing nitrogen. This results in a content of titanium nitride in the applied material. In gaseous alloying, the physical properties depend among other things on the concentration of active gas in the process atmosphere as well as the thermal cycles. The concentration of active gas can range between 10 ppm and 99.999%.

Accordingly, inert gases are predominantly used to prevent oxidation, and active gases are used to react in a controlled manner with the starting material, so as to achieve controlled structures of the applied material in terms of mechanical strength, corrosion and wear resistance, electrical conductivity or resistance.

EP 2 028 283 B1 discloses a generative production method that uses gaseous alloying. This method of forming an alloy comprises the following steps:

(a) Providing a heat source and a metal starting material in a gaseous atmosphere;

(b) Supplying a gaseous alloying element proximal to the metal starting material (c) Converging the heat source to the metal starting material and gaseous alloying element;

(d) Melting the metal starting material with the heat source so as to form a melted accumulation on a substrate, so that the metal starting material alloys with the gaseous alloying element, so as to form an alloyed composition of the melted accumulation;

(e) Initiating a relative movement between the metal starting material and the substrate, so as to form the melted accumulation into a first layer of the part;

(f) Repeating steps (a) to (e) to form additional layers on the first layer and defining a shape for the part;

(g) Changing a content of the gaseous alloying element with the metal starting material while performing steps (a) to (f) to form at least two domains with varying properties formed in the composition in a single, continuous process to form the mentioned at least two domains, so that the mentioned at least two domains are formed one adjoining the other by selectively timing the release of the gaseous alloying element with a timer, so as to change the content thereof in a controlled manner; and (h) Cooling and hardening of the composition.

Known from WO 2015/185155 A1 is a material for 3D printing. It is here provided that the material furnished for 3D printing consist of both material for 3D printing and a content of magnetic nanoparticles. The magnetic nanoparticles are embedded in the material for 3D printing. This is intended to enable the generation of components with a predetermined coding.

One overarching problem in producing components, and thus also in generatively producing components, is that it is currently impossible to easily and reliably differentiate between components and fakes or cheap copies. It is most often difficult to determine whether a component was produced by the original manufacturer (original equipment manufacturer (OEM)), or whether a component is a copy made by a third party, since the latter can hardly be told apart based on their appearance. However, there can be significant qualitative differences (strength, elasticity, hardness, porosity, ductility, etc.).

Problematic in particular is that generative production makes it possible to easily recreate or fake a low number of components without any extensive development or production costs and manufacturing processes.

There exists a need in industry for clear labels on components, so that liability issues can be clarified in particular in cases of damage.

Existing options for coding a component through embossing or engraving are limited with respect to the geometry or functionality of the component. For example, it only makes sense to engrave surfaces with a laser if this is integrated into the production process. In addition, the laser beam must be specially positioned with regard to its angle relative to the component. So-called DNA paintings are easily removed. Also known is to identify components in radio frequency processes. However, this technology is very expensive, with it being difficult and costly in particular to apply it to individual components. For this reason, manufacturers most often mark a complete device or machine at a single location, and not each individual component of this machine. As a result, this type of marking does not protect a complete machine against fakes, for example when building spare parts into this machine.

Therefore, the object of the invention is to provide a simple, safe and reliable method along with a corresponding device in particular for generatively producing and coding a three-dimensional component. Furthermore, the fewest possible additional steps are to be required.

This object is achieved by a method and a device according to the independent claims. Advantageous embodiments are indicated in the subclaims.

The invention provides a method for producing and coding a three-dimensional component. This method consists of the following steps:
Providing a starting material,
Supplying a process gas,
Melting the starting material with a heat source, and
Repeating the above steps.

The method is characterized in that a gaseous coding component or a coding gas containing a coding component is added to the starting material at least at a predetermined time interval during the melting process, that the use of the coding component in the finished object is detectable, and that information about the coding component is logged.

Within the framework of the present invention, a production method is understood in particular as a generative production method. However, all methods can be provided in which metals or other materials, e.g., plastic, are melted and/or heated, e.g., by welding, coating or soldering, and in which a gaseous coding component can react with the component or become integrated into the component during production.

The gaseous coding component can comprise one or several isotopes of at least one gas, wherein the content of the at least one isotope is changed by comparison to the naturally occurring content of this isotope in the gas.

The coding component can also consist of gaseous alloying elements, wherein the content of gaseous alloying element is preferably selected in such a way that the gaseous alloying element only negligibly changes the material properties of the component.

The quantity of integrated gaseous alloying elements selected is large enough as to render the alloying elements detectable in the finished component, e.g., by means of metallurgical and/or chemical and/or magnetic resonance analysis methods.

Logging can be understood as component-specifically storing data in electronic form or printing out the information on a certificate, e.g., also in machine-readable form.

The method according to the invention makes it possible to safely and reliably code a three-dimensional component in a simple and cost-effective manner.

In particular, it is advantageous that no additional production step is required for coding the component. Coding takes place by adding a coding component to the process gas at least at a predetermined time interval while melting the starting material. If this gaseous coding component is chemically active, it enters into a reaction with the metal, and the reaction product (e.g., an oxide, nitride, carbide) is embedded into the metal structure. However, coding molecules that do not react (e.g., because the local temperature is too low) can be integrated into the small gaps in the granular structure. This mechanism also functions for inert gases, which can be captured in the component in their original state. However, an inert gas can escape if compacting subsequently takes place (hot-isostatic pressing (HIP), heat treatment, degassing, etc.). For example, the coding component in the finished component can be detected in the finished component by means of chemical analysis methods or by means of a mass spectrometer. This can take place in a lab or with mobile devices.

Another advantage lies in the fact that the production parameters need not be modified or adjusted due to the coding.

In addition, it is advantageous that coding does not require another production step.

For example, the logging of coding information can involve storing coding information in a database or on a chip, etc.

The coding can be introduced over a complete component or only in a targeted manner at predetermined locations or areas of the component. Furthermore, coded areas can overlap each other, border each other or be geometrically separate from each other owing to the layered construction during generative production.

Because the coding information is logged and/or stored in a database, which coding component was introduced at what location of the component is precisely recorded or logged.

The coding information can contain indications about the type and/or content of the coding component and/or about the location of the coding component in the object and/or about the serial number of the object.

Based on the coding information, it can be easily determined at a later point whether an original component is involved or not, specifically by analyzing the area of the component into which the coding component was introduced.

Such a coding is nearly forgery-proof, since the coding information is not available to a potential forger, and is not visible from outside.

As a consequence, the coding information can be used to detect the finished object with respect to its coding component, for example by means of a chemical analysis process or by means of a mass spectrometer.

Within the framework of the present invention, generative production is understood as constructing a three-dimensional component in layers or coatings using a powder bed, a powder feed or a wire feed, which serve as the starting material, and are melted by means of a laser beam, electron beam or plasma and electric arcs. In this regard, reference is made to the generative production methods mentioned in the introduction to the specification (3D printing or during hardening by chemical activators, melting and solidification (laser engineered net shaping (LENS), as direct metal deposition (DMD) or as laser additive manufacturing (LAM)), local sintering or melting (laser sintering (SLS)), metal-laser sintering (DMLS), metal-laser sintering (IMLS), electron beam melting (EBM)).

Within the framework of the present invention, materials such as polymers, ceramics, synthetic resins, plastics and preferably metals can be provided as the starting material.

The process gas can consist of an inert gas, such as nitrogen, argon, helium, neon, krypton, xenon, radon or even mixtures thereof, and/or an active gas, such as $O_2$, $CO_2$ and $H_2$ or even mixtures thereof.

A mixture of process gas and coding component is referred to as coding gas below. Preferably provided as the coding component mixed with a corresponding process gas or also used in pure form is oxygen 18 carbon dioxide ($C^{18}O_2$), carbon 13 carbon dioxide ($^{13}CO_2$), carbon 13 carbon monoxide ($^{13}CO$), deuterium ($D_2$), nitrogen 15 ($^{15}N_2$) and oxygen 18 ($^{18}O_2$).

For example, the coding component consists of one or several isotopes of a gas, preferably of the process gas, wherein the content of an isotope is changed relative to the natural content of isotopes in the gas. This means that the ratio of the isotope has been changed relative to the naturally occurring ratio. For example, the ratio of $^{14}N$ (frequency=99.634) to $^{15}N$ (frequency=0.366) is changed for nitrogen in such a way that the content of $^{15}N$ is elevated, and the content of $^{14}N$ is diminished or vice versa. For example, when using a carbonaceous coding component, the ratio of $^{12}C$ (frequency=98.9) to $^{13}C$ (frequency=1.1) is changed in such a way that the content of $^{13}C$ is elevated and the content of $^{12}C$ is diminished or vice versa. For example, the ratio of $^1H$ (frequency=98.9885) to $^2H$ (frequency=0.0115) can be changed in such a way for hydrogen that the content of $^2H$ is elevated and the content of $^1H$ is diminished or vice versa.

For example, it can be provided that the frequency of isotopes relative to the naturally occurring frequency be elevated or diminished by roughly or more than 0.5% or 1.0% or 1.5% or 2.5% or 5.0% or 10.0% or 25% or 50.0% or 75% or 100% or 150% or 200% or 500% or 1000%.

Preferably provided as isotopes are nitrogen 15 and nitrogen 14 and/or carbon 12, carbon 13 and/or carbon 14 and/or also oxygen 16 and/or oxygen 18, for example. Argon 36, 38, 39, 40 can further be provided. While argon is inert and does not react with the material, it is possible to provide gaseous inclusions for coding, since no 100% component density is achieved, in particular in the powder bed method.

The use of hydrogen 2 or hydrogen 3 as well as helium 3 and helium 4 isotopes is basically also conceivable.

In order to provide more complex codings, the coding component can also contain two or three or more different isotopes. Accordingly, the coding component can comprise one or several isotopes of the process gas other than the naturally occurring ones. For example, oxygen isotopes can be combined with nitrogen isotopes or also C isotopes in $CO_2$ can be combined with H isotopes in $H_2$.

The metallurgical starting material can be provided in the form of a powder bed or powder feed or wire feed. A laser beam, electron beam or plasma/electric arc can be provided as the heat source.

The invention further provides a device for producing, in particular for generatively producing, and coding three-dimensional components. This device consists of:
preferably one processing chamber,
a building platform on which a starting material can be provided,
a process gas feeding device for supplying a process gas,
a heating source for melting the starting material,
and a coding component feeding device, which is connected with a control device in such a way that a gaseous coding component or a coding gas containing a coding component is supplied to the starting material at least at a predetermined time interval during the melting process, that the use of the coding component in the finished object is detectable, wherein the gaseous coding component preferably consists of one or several isotopes of at least one gas, and the content of the at least one isotope is changed relative to the naturally occurring content of this isotope in the gas.

In addition, a database can be provided for storing coding information.

The advantages to the device according to the invention essentially correspond to the advantages to the method according to the invention.

A mixing chamber can further be provided for mixing the coding component into the process gas, wherein process gas or a mixture of process gas and coding component can be supplied to the processing chamber from the mixing chamber. Accordingly, the mixing chamber has a first inlet for supplying a process gas and a second inlet for supplying a coding component, e.g., carbon$^{13}$C-dioxide (99%), nitrogen$^{15}$N (98%), etc., or a second inlet for supplying a process gas containing a coding component and an outlet that is connected with the processing chamber. Such an external mixing chamber is advantageous, since existing systems or devices can thus be expanded in a way that enables a coding of the component.

The processing chamber can itself also have two inlets, wherein one inlet is provided for supplying process gas, and the other inlet for supplying a coding component or a process gas containing a coding component (premix) from corresponding storage containers.

The process gas has a design or composition that allows it to ensure the properties of the component desired from a chemical metallurgical standpoint, and additionally enables a clear component designation or coding. As a consequence, component-related process gases must be provided with a corresponding coding component. The coding component can thus also be provided as a premix from a gas storage container, which contains both process gas and a corresponding content of coding component. This gas storage container with the premix then forms the coding component feeding device.

The coding component feeding device can thus be the mixing chamber, the premix storage container or the storage container that contains the coding component.

The addition of the coding component can be controlled by a control device. This control device can consist of a coding component regulating device with a closed control loop, which regulates the supply. The coding component regulating device uses a sensor to acquire an actual value for one or several volume flows in the processing chamber and/or the mixing chamber, compares it with a prescribed desired value for one or several volume flows, after which the prescribed desired value is set by way of an actuator.

Understood by volume flow or flows are the values for the corresponding gas flows, which are supplied to the processing chamber by the coding component feeding device.

The coding component can preferably consist of oxygen 18 carbon dioxide ($C^{18}O_2$), carbon 13 carbon dioxide ($^{13}CO_2$), carbon 13 carbon monoxide ($^{13}CO$), deuterium ($D_2$), nitrogen 15 ($^{15}N_2$) and oxygen 18 ($^{18}O_2$) or also mixtures thereof.

The frequency of the isotope relative to the naturally occurring frequency can be elevated or diminished approximately by 0.5% or by 1.0% or by 1.5% or by 2.5% or by 5.0% or by 10.0% or by 25% or by 50.0% or by 75% or by 100% or by 150% or by 200% or by 500% or by 1000%.

Examples of specific information for elevating or diminishing the isotope ratios are provided in the following table.

The coding component can consist of at least one isotope of an inert gas, wherein the isotope is integrated into the component.

The coding component can contain several different isotopes (isotopes of varying gases) in predetermined ratios, wherein the various isotopes in the component comprise the coding.

The isotopes can be isotopes of the gas that make up the primary component of the process gas.

The isotopes can also be isotopes that do not arise in the process gas.

Nitrogen $^{15}N$ isotopes can sometimes behave inertly and sometimes reactively, depending on the alloying element, temperature, concentration and/or reaction time.

Even in a gaseous state, hydrogen isotopes can be integrated into microporosities, react with atomic oxygen and dissolve, or they can form metal hydrides via adsorption on metal surfaces and remain in the component.

Carbon isotopes $^{12}C$ and $^{13}C$ are provided in the form of carbon dioxide, which is then separated out in the method.

Some isotopes of H, N, CO can be added to the method as part of a chemical compound, such as: $C^{18}O_2$, $^{13}CO_2$, $N_2H_3$ and $^{15}NH_3$.

Such a coding gas is used for coding components according to the method described above.

While contemporary systems are not necessarily suitable for active gas mixtures with $O_2$ or $CO_2$, they could be

| Type of coding | Element | Type of isotope used to enrich a base gas to provide a coding | Naturally occurring concentration of isotopes | Possible molecules | Area of isotopic metering to a base gas |
|---|---|---|---|---|---|
| Inert isotopes to be integrated into microporosities of a component | Ar | $^{36}Ar$ | $^{36}Ar$: 0.337%<br>$^{38}Ar$: 0.063%<br>$^{40}Ar$: 99.6% | N/A | Between 1.1 and 10 times the naturally occurring content of the isotope or less than or equal to 0.9 times the natural content |
| | He | $^{3}He$ | $^{3}He$: 0.000137%<br>Remainder: $^{4}He$ | N/A | Between 1.1 and 10 times the naturally occurring content of the isotope or less than or equal to 0.9 times the natural content |
| | H | $^{2}H$ | $^{2}H$: 0.012%<br>Remainder: $^{1}H$ | $^{2}H_2$<br>$^{2}H^{1}H$<br>$N_2H_3$ | $^{2}H_2$: Between 1 ppm and 10 ppm<br>$^{2}H^{1}H$: Between 1.1 and 10 times the naturally occurring content of the isotope or less than or equal to 0.9 times the natural content<br>$N_2H_3$: Between 1 ppm and 10 ppm |
| | Kr | $^{78}Kr$<br>$^{82}Kr$<br>$^{84}Kr$<br>$^{86}Kr$ | $^{78}Kr$: 0.35%<br>$^{80}Kr$: 2.25%<br>$^{82}Kr$: 11.6%<br>$^{83}Kr$: 11.5%<br>$^{84}Kr$: 17.3%<br>$^{86}Kr$: 17.3% | N/A | $^{78}Kr$ and $^{82}Kr$: Between 1.1 and 10 times the naturally occurring content of the isotope or less than or equal to 0.9 times the natural content<br>Other: Between 1.001 and 1.1 times the naturally occurring content of the isotope or less than or equal to 0.99 times the natural content |
| | Ne | $^{20}Ne^{21}Ne^{22}Ne$ | $^{20}Ne$: 90.48%<br>$^{21}Ne$: 0.27%<br>$^{22}Ne$: 9.25% | N/A | $^{21}Ne$ and $^{22}Ne$: Between 1.001 and 1.1 times the naturally occurring content of the isotope or less than or equal to 0.99 times the natural content |
| | Xe | $^{124}Xe$<br>$^{129}Xe$<br>$^{131}Xe$<br>$^{132}Xe$<br>$^{134}Xe$<br>$^{136}Xe$ | $^{124}Xe$: 0.095%<br>$^{126}Xe$: 0.089%<br>$^{128}Xe$: 1.91%<br>$^{129}Xe$: 26.4%<br>$^{130}Xe$: 4.07%<br>$^{131}Xe$: 21.2%<br>$^{132}Xe$: 26.9%<br>$^{134}Xe$: 10.4%<br>$^{136}Xe$: 8.86% | N/A | $^{124}Xe$, $^{129}Xe$: Between 1.1 and 10 times the naturally occurring content of the isotope or less than or equal to 0.9 times the natural content<br>Other: Between 1.001 and 1.1 times the naturally occurring content of the isotope or less than or equal to 0.99 times the natural content |

The coding component can contain at least one isotope of an active gas, which reacts with the material of the component to be produced in such a way as to remain in the component.

operated in this way if it made sense from a metallurgical standpoint. Generative methods that take place outside of a chamber (laser metal deposition, wire arc additive manufacturing, plasma-powder or wire based electric arc methods) can be implemented with gases without limitation.

The reason why contemporarily processing chambers are not provided for the use of reactive gases lies in the fact that it has thus far not been attempted. Known technologies most often use inert gases, so that metallurgical behavior can be examined without any additional chemical reaction. However, processing chambers for LMF (SLM) can be easily adjusted to active gas mixtures.

Embodiments for generative production outside of processing chambers are significantly more flexible with respect to the gas mixtures. It then even becomes possible to use two or three different gas feeds to the processing area. The major difference in comparison to processing chambers is the response behavior to changed gas compositions. While limiting the integration of isotopes to a specific area of a component is not that simple in the processing chamber, it is more easily possible in an open method, such as one involving the electric arc or plasma of the isotopes, to more precisely arrange the isotopes, and even vary them more frequently within a component. Therefore, the invention also provides for production outside of a processing chamber without process gas. In such methods, the coding gas must then be supplied separately if the process takes place in ambient air.

The invention will be explained in more detail below based on a FIGURE. Shown on;

FIG. 1 is a schematic view of a device according to the invention.

A device 1 for generatively producing and coding a three-dimensional component is described below. As already mentioned, nearly any device 1 for generatively producing three-dimensional components is basically suitable for implementing the method according to the invention.

The invention will be exemplarily explained in a general form based on a laser-melting device 1 with a powder bed (FIG. 1).

The laser-melting device consists of a processing chamber 2, which is outwardly closed by a chamber wall 3 and borders a processing area 4. The processing chamber 2 serves as an assembly space for the three-dimensional component.

Arranged in the processing chamber 2 is an upwardly open container 13. Situated in the container 13 is a building platform 5 for accommodating the component 6 to be produced. The building platform 5 has a height adjustment device, which can be used to vertically adjust the building platform 5 in such a way that a surface of a layer to be newly hardened is arranged in a working plane.

The device 1 further consists of a storage container 7. The storage container 7 is designed to hold a hardenable, powdery starting material.

Further provided is an application device 8 for applying the starting material to the building platform 5. Such an application device 8 can be moved in a horizontal direction parallel to the working plane.

Additionally provided is a laser 9 for generating a laser beam or a heat source. A laser beam generated by the laser 9 is deflected by a deflecting device 10, and focused by a focusing assembly (not shown) on a predetermined point directly below the working plane. The deflecting device 10 can be used to change the progression of the laser beam in such a way as to melt the locations of the applied layer that correspond to the cross section of the object to the produced.

Additionally provided is a process gas feeding device 11, which can be used to expose the processing chamber 2 to a process gas.

The process gas feeding device 11 has a storage container for the process gas, wherein the process gas storage container (not shown) is connected with the processing chamber 2 via a line section.

Further provided is a coding component feeding device 12, which can be used to expose the processing chamber 2 to a coding component.

The coding component feeding device has a storage container (not shown) for the coding component. The latter is connected with the processing chamber 2 via a line section.

A mixing chamber (not shown) can alternatively be provided. The mixing chamber has an inlet for supplying a process gas from the storage container for process gas and an inlet for supplying a coding component from the storage container for the coding component.

The process gas and coding component can also be provided as a pre-mixture (premix) from a gas storage container (not shown), which contains both process gas and a corresponding content of coding component. This gas storage container containing the premix then comprises the coding component feeding device, and is connected directly with the processing chamber 2 in addition to the storage container for the process gas, or with the mixing chamber.

Further provided is a control device (not shown) for controlling the addition of the coding component. The control device consists of a coding component regulating device with a closed control loop, which regulates the addition. The coding component regulating device can consist of a P-regulator, an I-regulator, a D-regulator and combinations thereof, e.g., a PID regulator. The coding component regulating device uses a sensor to acquire an actual value for the one or several volume flows in the processing chamber 2 and/or mixing chamber, compares it with a prescribed desired value for one or several volume flows, after which the prescribed desired value is set by way of an actuator.

A method according to the invention will be described below based on an exemplary embodiment.

In the first step, a metal starting material is here applied or provided on the building platform 5 in the form of a powder bed by means of the coating device. Alternatively, the metal starting material can also be supplied by means of a powder feed or a wire feed.

In a second step, an inert protective gas such as nitrogen is then supplied to the processing chamber 2 as the process gas by means of the process gas feeding device 11.

In a subsequent step, the starting material is melted by means of the laser 9.

Since the melted volume is as a rule rather small in nearly all generative methods, the layer is cooled while the laser melts material at another location or even while a new powder layer is being applied.

In addition, a stabilizing step can be provided in specific processes, in which the layer is cooled and hardened.

These steps are repeated.

The coding component is then supplied to the processing chamber, either continuously or at a predetermined time. As a rule, process gas is permanently located in the processing chamber. The buildup process as a rule only starts once the requirements for $O_2$ and $H_2O$ content have been met. If the process gas is nitrogen or a nitrogen-containing mixture (with the same holding true for argon), then the process gas can contain a coding component of a kind where the content of nitrogen 15 and nitrogen 14 isotopes relative to the natural content of nitrogen 15 and nitrogen 14 isotopes or their correlation has been changed. With respect to nitrogen, for example, the ratio of $^{15}$N (frequency=99.34) to $^{15}$N (frequency=0.366) is changed in such a way that the content of $^{15}$N is elevated, and the content of $^{15}$N is diminished (or vice versa).

The coding component imparts a unique isotope signature to this area of the component.

In additional layers of the component, the original process gas can be used once again, which contains no coding component.

The coding of the component with a coding component can be repeated, so that varying layers or areas on the component are coded. Coding areas requires that the process of producing a layer be interrupted, the atmosphere in the processing chamber be changed or the process gas composition be changed, and the residual layer be produced. This step must be correspondingly repeated for ensuing layers, so that an area of the component is then coded.

Use can here be made of the same respective coding component, or different coding components can also be used.

The coding information is stored in a database.

All parameters necessary for producing the three-dimensional component are also electronically stored.

The coding component feeding device can be connected with an interface of the device in such a way as to precisely store at what time or predetermined time interval in melting the starting material that a coding component is allocated to the protective gas. This makes it possible to precisely determine or detect where the coding is arranged in the component.

This coding information can advantageously also be linked with the serial numbers of the component.

For example, it is possible in a first series of components to produce the lowermost layer or lowermost layers while adding a coding component. In another series of components, other layers can then be produced with the coding component. For a single series of components, this makes it possible to code the latter at different locations.

Varying the coding of an individual series makes it even more difficult for forgers to falsify the coding.

According to the invention, the used isotopes can be isotopes of the protective gas, i.e., for example when using nitrogen as the protective gas, the ratio between nitrogen 15 and nitrogen 14 isotopes is changed. For example, carbon dioxide containing carbon 12, carbon 13 and carbon 14 isotopes can also be provided.

For example, argon, oxygen isotopes and nitrogen isotopes can be combined while producing components out of aluminum.

While producing components out of stainless steel or nickel-based alloys, a combination of carbon isotopes in $CO_2$ and hydrogen isotopes in $H_2$ can be used.

Inert isotopes can in principle be used independently of material, since embedding into the microporosities is a purely mechanical process.

However, it is also possible to add other isotopes of another gas together with a content of this other gas to the protective gas as the coding component.

In an ensuing step, the finished three-dimensional component can be analyzed with the help of a detection device, for example a mass spectrometer (gas chromatograph), so as to in so doing check the coding or originality of the component. An analysis can also be performed via magnetic resonance or using chemical analytical methods.

Another exemplary embodiment of the method according to the invention provides a gaseous alloying element as the coding component.

For example, it can here be provided that an inert gas such as argon be used as the process gas, which contains a small portion of between 1 ppm and 10,000 ppm of nitrogen 15 as the coding component. The metal starting material contains titanium. During the production of the three-dimensional component, a small portion of the titanium thus reacts with the nitrogen 15, and yields titanium nitride 15. The latter is indistinguishable from titanium nitride 14 in terms of its chemical and physical properties, and therefore cannot be detected by means of a chemical analysis method. However, it is possible to analyze the component with a mass spectrometer. It is then determined that the component under a nitrogen atmosphere was produced with an elevated nitrogen 15 content.

As a consequence, the method according to the invention can be used to code specific areas or layers of a three-dimensional component, and to then detect this coding.

REFERENCE LIST

1 Device
2 Processing chamber
3 Chamber wall
4 Processing area
5 Building platform
6 Component
7 Storage container
8 Application device
9 Laser
10 Deflecting device
11 Process gas feeding device
12 Coding component feeding device
13 Container

The invention claimed is:

1. A method for producing and coding a three-dimensional component, comprising:
providing a metal starting material;
supplying a process gas to the starting material;
melting the starting material with a heat source; and
repeating the above steps until completion of the three-dimensional component,
wherein, during at least at a predetermined time interval of the melting of the starting material, a gaseous coding component is added to the starting material and the coding component is integrated into the three-dimensional component such that the coding component is detectable in the three-dimensional component and the three-dimensional component is thereby coded, and
wherein the gaseous coding component comprises at least one isotope of at least one gas, and content of the at least one isotope is changed in comparison to a naturally occurring content of the at least one isotope in the at least one gas,
said method further comprising logging information about the coding component.

2. The method of claim 1, wherein the process gas comprises an inert gas, an active gas, or both an inert gas and an active gas, and
wherein said inert gas is selected from argon, helium, neon, krypton, xenon, and radon,
said active gas is selected from $O_2$, $CO_2$, $H_2$ and $N_2$, and mixtures thereof, and
the coding component comprises oxygen 18 carbon dioxide ($C^{18}O_2$), carbon 13 carbon dioxide ($^{13}CO_2$), carbon 13 carbon monoxide ($^{13}CO$), deuterium ($D_2$), nitrogen 15 ($^{15}N_2$) and oxygen 18 ($^{18}O_2$), and mixtures thereof.

3. The method of claim 2, wherein the process gas comprises the inert gas.

4. The method of claim 2, wherein the process gas comprises the active gas.

5. The method of claim 1, wherein the frequency of the at least one isotope relative to the naturally occurring frequency is elevated or diminished by more than 0.5%.

6. The method of claim 1, wherein the coding component comprises at least one isotope of an active gas, which reacts with the material of the component to be produced in such a way as to remain in the component.

7. The method of claim 1, wherein the coding component comprises a plurality of different isotopes in predetermined ratios, wherein the plurality of different isotopes in predetermined ratios in the coding component comprise the coding.

8. The method of claim 1, wherein the at least one isotope comprises isotopes of a gas that is a primary component of the process gas.

9. The method of claim 1, wherein the coding component comprises a gaseous alloying element, wherein content of the gaseous alloying element is selected such that the gaseous alloying element only negligibly changes material properties of the three-dimensional component.

10. The method of claim 1, wherein the logging of information about the coding component comprises storing of the information in a database.

11. The method of claim 1, wherein the information about the coding component is used to detect the three-dimensional component via detection of the coding component by a chemical analysis process or a mass spectrometer.

12. The method according of claim 1, wherein the metal starting material is provided in a form of a powder feed or wire feed, and the heat source is a laser beam, an electron beam, or a plasma/electric arc.

13. The method of claim 1, wherein the coding component comprises at least one isotope of an inert gas, wherein the isotope is integrated into the component.

14. The method of claim 1, wherein the at least one isotope is different from isotopes in the process gas.

15. The method of claim 1, wherein the coding information contains at least one of the following:
information about the form of the coding component,
information about the content of the coding component,
information about location of the coding component in the three-dimensional component, and
information about a serial number of the three-dimensional component.

16. The method of claim 1, wherein the coding component is not integrated throughout the three-dimensional component.

17. The method of claim 16, wherein the coding component is only integrated into one or more predetermined locations or areas of the three-dimensional component.

18. The method of claim 17, wherein the coding component is only integrated into a plurality of predetermined locations or areas of the three-dimensional component, and each of said locations or areas are geometrically separate from each.

19. The method of claim 1, wherein said at least one isotope is one or more isotopes selected from nitrogen 15, nitrogen 14, carbon 12, carbon 13, carbon 14, oxygen 16, oxygen 18, argon 36, argon 38, argon 39, argon 40, hydrogen 3, helium 3, and helium 4.

20. The method of claim 1, wherein said coding component is selected from oxygen 18 carbon dioxide ($C^{18}O_2$), carbon 13 carbon dioxide ($^{13}CO_2$), carbon 13 carbon monoxide ($^{13}CO$), nitrogen 15 ($^{15}N_2$) and oxygen 18 ($^{18}O_2$), and mixtures thereof.

21. A device for producing three-dimensional components, comprising:
a building platform on which a starting material can be provided;
a process gas feeding device for supplying a process gas;
a heating source for melting the starting material; and
a coding component feeding device that is connected with
a control device for supplying a gaseous coding component or a coding gas containing a gaseous coding component to the starting material at least at a predetermined time interval during the melting so that the coding component in the three-dimensional component is detectable, and
a database for storing coding information,
wherein the gaseous coding component comprises at least one isotope of at least one gas, and content of the at least one isotope is changed in comparison to a naturally occurring content of the at least one isotope in the at least one gas.

22. The device of claim 21, further comprising a processing chamber.

23. The device of claim 21, wherein the coding component feeding device comprises a mixing chamber for mixing the coding component into the process gas, wherein process gas or a mixture of process gas and coding component can be supplied to the processing chamber from the mixing chamber.

24. The device of claim 21, further comprising a control device comprising a coding component regulating device with a closed control loop for regulating the supply of coding component, and a sensor which is used to acquire a value for at least one volume flow in the processing chamber or the mixing chamber and compare the at least one volume flow with a prescribed desired value, after which the prescribed desired value is set by an actuator.

25. The device of claim 21, wherein the coding component feeding device comprises a gas storage container that contains both process gas and a corresponding content of coding component.

* * * * *